July 9, 1946.    D. H. MILLER ET AL    2,403,674
MOLDED FRICTION ELEMENT
Filed July 16, 1942
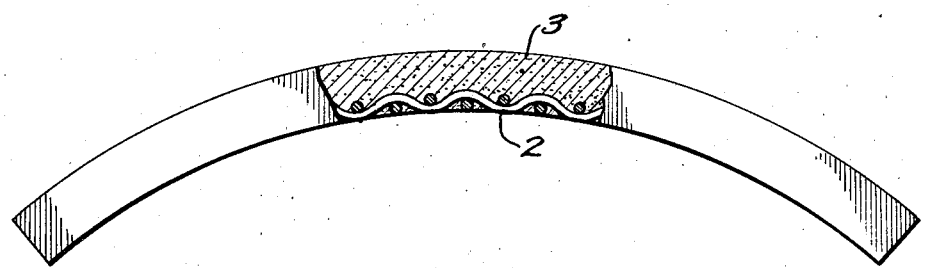
INVENTORS
DAVID HENRY MILLER
PHILLIP H. KNOWLES
WILFRED A. HUGHES
BY Edmund H. O'Brien
ATTORNEY

UNITED STATES PATENT OFFICE 2,403,674

MOLDED FRICTION ELEMENT

David Henry Miller, Phillip H. Knowles, and Wilfred A. Hughes, Wilton, Conn., assignors to The Gilbert and Bennett Manufacturing Company, Georgetown, Conn., a corporation of Connecticut Application July 16, 1942, Serial No. 451,236

4 Claims. (Cl. 188—251)

This invention relates to coated wire cloth and the incorporation thereof as a reinforcing means in friction elements such as clutch or brake segments or clutch discs.

In the manufacture of friction elements such as molded clutch or brake linings and friction discs or plates, strips or sheets of wire cloth or screening have been used heretofore for reinforcement. It has always been considered necessary, however, to use for this purpose a wire cloth coated with some metal such as zinc to hold the wire strands firmly in place.

We have found that excellent results can be obtained in the manufacture of friction elements such as molded brake or clutch segments and friction plates or discs by utilizing for reinforcement wire cloth coated with certain inorganic, and in some cases partly or wholly organic, non-metallic coating materials.

It is an object of our invention, therefore, to provide wire cloth coated with a non-metallic coating of such a composition that the coated wire cloth can be utilized directly for the manufacture of molded friction elements.

A further object of the invention is the provision of molded friction elements and the preparation thereof incorporating such a coated wire cloth as a reinforcing means.

Our invention is illustrated in the annexed drawing wherein 2 represents the wire cloth reinforcement coated with certain inorganic, and in some cases partly or wholly organic, non-metallic coating materials, and 3 represents a molded brake lining in which the wire cloth reinforcement is positioned. In a similar manner the reinforcement could be incorporated in any of the other friction elements referred to above.

Woven wire cloth is ordinarily manufactured in sheets or strips much larger in size than are required for their ultimate use. It is a practical necessity, therefore, to slit or cut the wire cloth into smaller pieces after it is made and before it is actually placed in use. Such slitting or cutting of the wire cloth leaves the sharp ends of the wire strands projecting along the line of the cut, and if special provision is not made, these cut ends of the wire strands are bent or turned over so that they interfere with the subsequent use of the cut strips in molded friction elements. Paint and lacquer coatings ordinarily applied to wire cloth do not stiffen the wire cloth sufficiently to keep these sharp strand ends in the same plane with the main body of the wire cloth during the slitting operation. For this, as well as other, reasons, the usual type of paint or lacquer coatings cannot be used for purposes of our invention.

In addition to the foregoing stiffening requirements of the coating, it is desirable, in accordance with our invention, to provide a coating for the wire cloth that provides substantial resistance to weathering. While it is not essential that the coating serve as a complete waterproofing agent or rust-preventing means, it is desirable that the coating form at least a means for preventing undue corrosion of the wire cloth during reasonable periods of handling and storage.

It is also essential for wire cloth used in molded friction elements, that the coating for the wire cloth should not interfere with the manufacture or with the use of the friction elements in which it is incorporated.

In the manufacture of molded friction elements such as brake and clutch bands or clutch discs, various resins are used as the binding and molding medium, and are subjected to temperatures of around 400° F. during the manufacture of the articles. It is essential, therefore, that the coating on the reinforcing wire cloth should not burn or decompose with the evolution of gas during this manufacturing process. Furthermore, such bands or other friction elements are frequently heated under severe conditions of use to temperatures of around 800° F.

Because of the exacting conditions under which such friction elements are made, it has always been considered necessary that such wire cloth should be coated by dipping it in some molten metal such as zinc, lead or the like. We have found, however, that certain baked non-metallic coatings for the wire cloth are admirably suited for this purpose. For example, sodium silicate together with a plasticizing or other material furnishing flexibility provides a good coating for the wire cloth that may be made flexible and tough so as to hold the wire strands firmly in place without substantial cracking-off, and that is sufficiently waterproof to offer good protection to the wire cloth before it is incorporated in a molded friction element. Other inorganic or partly inorganic coatings that are effective include dispersions of pigments such as zinc chromate in a suitable vehicle. Various resins, such as polymerized vinyl esters, urea-formaldehyde resins, phenol-formaldehyde resins, glyptal resins, coumarone-indene resins and certain casein plastics may also be employed. Other organic coatings that are suitable include the natural resins, and certain cellulose nitrate or cellulose acetate base coatings.

Most of these coatings, and particularly the resinous coatings, should be thermo-setting in character and heated or baked in place after they are applied to the wire cloth. The exact temperature of baking will vary, of course, with different coatings, although in most cases the temperature should be carried somewhat above the boiling point of water for a sufficient time to complete any chemical reaction that may take place and to form a tough, flexible coating that stiffens the wire cloth sufficiently to permit slitting without bending over the cut ends of the wire strands.

The following silicate coatings are given as examples of coating compositions that have been found to be suitable for this purpose:

1. 1 gallon of a commercial sodium silicate solution (water glass) mixed with 4 ounces of dextrine and an equal quantity of water;
2. Two parts by volume of commercial sodium silicate solution (water glass) mixed with one part of formaldehyde (37% solution) and two parts of water.

Other partly inorganic coating compositions that are suitable include:

3. One part, by volume, of a zinc chromate primer consisting principally of zinc chromate dispersed in a drying oil medium, and known as "Standard Navy Zinc Chromate Primer," to one to two parts of a suitable thinning solvent such as a butyl acetate solvent or a mixture of suitable hydrocarbon solvents.

Examples of purely organic coating compositions include the following:

4. A solution of about 3 parts, by volume, of polymerized vinyl chloride, or a copolymer of vinyl acetate and vinyl chloride, in about 2 parts of a suitable lacquer solvent such as a mixture of acetates.
5. A polyvinyl acetate emulsion having a solids content of about 60% consisting principally of polymerized vinyl acetate, the balance being principally water.
6. A baking varnish consisting of 8 gallons of a suitable drying oil such as linseed oil or China-wood oil, and 100 lbs. of phenolic resin such as a thermo-setting phenolformaldehyde resin. Other resins such as the oil soluble styrene resins may be substituted.

In the application of the coating solution to the wire cloth, various procedures may be followed. For example, the coating solution or dispersion may be sprayed or flowed onto the wire cloth or the cloth may be dipped or run continuously through a liquid bath of the coating agent. In each case, the viscosity of the coating liquid should be adjusted for the particular mode of application that is used. Immediately following the application of the coating agent, the meshes of the wire cloth should be cleared of any bubbles or films by means of blown air or the like, and the coated wire cloth is then baked to fix the coating in place and produce the desired stiffening. Baking may be carried out by passing the wire cloth through a suitable oven or subjecting it to the direct heat from radiation type baking lamps.

The baking temperature should in general be at least about 200° F., but will vary with the composition of the particular coating applied. For the sodium silicate coatings, a temperature of 210° F. is sufficient, although with a zinc chromate or similar pigmented primer type of coating, a baking temperature of 325–350° F. is needed. For coating compositions using an oil, the baking temperature is usually higher than with other compositions, best results being obtained between 300 and 400° F. Certain of the resinous coatings, such as one of the vinyl resins, in a relatively volatile organic solvent produces good results when baked for several minutes at 225° F.

The baked coated wire cloth can then be cut to size with any suitable type of slitting mechanism, care being exercised to keep the cut ends of the strips as straight as possible. The strips of cut wire cloth are then ready to be incorporated in the usual manner in molded friction elements, as will be understood by those skilled in the art.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

We claim:

1. A molded friction element having a wire cloth reinforcing insert molded therein at a point spaced from one friction face, said insert comprising woven wire cloth coated with a baked non-metallic stiffening composition capable of bending without substantial cracking and of withstanding temperatures in excess of 400° F. without decomposition.

2. A molded friction element having a wire cloth reinforcing insert molded therein at a point spaced from one friction face, said insert comprising woven wire cloth coated with a baked mixture of a silicate and a plasticizing agent.

3. A molded friction element having a wire cloth reinforcing insert molded therein at a point spaced from one friction face, said insert comprising woven wire cloth coated with a baked pigmented varnish.

4. A molded friction element having a wire cloth reinforcing insert molded therein at a point spaced from one friction face, said insert comprising woven wire cloth coated with a baked resin capable of bending without substantial cracking and of withstanding temperatures in excess of 400° F. without decomposition.

DAVID HENRY MILLER.
PHILLIP H. KNOWLES.
WILFRED A. HUGHES.